United States Patent [19]

Lancaster, III et al.

[11] Patent Number: 5,161,349
[45] Date of Patent: Nov. 10, 1992

[54] BIAXIAL STRETCH WRAPPING

[75] Inventors: Patrick R. Lancaster, III; William G. Lancaster; John Fain, all of Louisville; Phil Moore, Mount Wastington, all of Ky.; Curtis Martin, New Albany, Ind.

[73] Assignee: Lantech, Inc., Louisville, Ky.

[21] Appl. No.: 595,884

[22] Filed: Oct. 2, 1990

[51] Int. Cl.⁵ .............................................. B65B 11/04
[52] U.S. Cl. ..................................... 53/399; 53/441; 53/556; 53/587; 53/588; 53/389.4
[58] Field of Search .............. 53/399, 441, 556, 587, 53/389.4, 588; 264/290.2, DIG. 73

[56] References Cited

U.S. PATENT DOCUMENTS

| | | |
|---|---|---|
| 634,307 | 10/1899 | Neidhardt . |
| 679,425 | 7/1901 | Kertesz . |
| 1,716,555 | 6/1929 | Kane . |
| 2,042,010 | 5/1936 | Lewis .................................. 26/63 |
| 2,144,356 | 1/1939 | Alles ........................... 264/DIG. 73 |
| 2,597,041 | 5/1952 | Stokes ................................ 53/141 |
| 2,841,820 | 7/1958 | Pfeiffer . |
| 3,104,937 | 9/1963 | Wyckoff .......................... 264/290.2 |
| 3,466,358 | 9/1969 | Muller ............................... 264/287 |
| 3,501,565 | 3/1970 | Kalwaites ........................ 264/290.2 |
| 3,808,639 | 5/1974 | Tautvaisas .......................... 19/161 |
| 3,849,526 | 11/1974 | Muller et al. ...................... 264/286 |
| 4,087,226 | 5/1978 | Mercer ............................... 425/397 |
| 4,101,625 | 7/1978 | Haley ................................. 264/287 |
| 4,114,008 | 3/1979 | Schwarz ............................. 425/66 |
| 4,116,892 | 3/1979 | Schwarz ............................. 521/62 |
| 4,151,245 | 4/1979 | Suzuki ............................... 264/288 |
| 4,153,751 | 5/1979 | Schwarz ............................. 428/304 |
| 4,223,059 | 9/1980 | Schwarz ............................. 428/198 |
| 4,251,585 | 2/1981 | Schwarz ............................. 428/188 |
| 4,285,100 | 8/1981 | Schwarz ............................. 19/161.1 |
| 4,289,832 | 9/1981 | Schwarz ............................. 428/542 |
| 4,336,638 | 6/1982 | Mercer .............................. 26/99 |
| 4,368,565 | 1/1983 | Schwarz ............................. 26/99 |
| 4,374,690 | 2/1983 | Canterino et al. .................. 156/229 |
| 4,418,510 | 12/1983 | Lancaster, III et al. ............. 53/399 |
| 4,872,246 | 10/1989 | Yano ................................. 29/116.1 |
| 4,956,140 | 9/1990 | Rolles .............................. 264/290.2 |

FOREIGN PATENT DOCUMENTS 343453 11/1989 European Pat. Off. ............. 53/556
WO89/11420 11/1989 PCT Int'l Appl. .

Primary Examiner—John Sipos
Attorney, Agent, or Firm—Finnegan, Henderson, Farabow, Garrett & Dunner

[57] ABSTRACT

Stretch wrapping packaging material on a load includes introducing stretch wrap packaging material onto V shaped tips of projecting portions of a first grooved roller so that the packaging material spans the nonprojecting portions of the first grooved roller. The web of packaging material and the first grooved roller are transported in the direction generally parallel to the grooves. The web of packaging material spanning the nonprojecting portions of the first grooved roller is impinged with V shaped tips of projecting portions of a second grooved roller. The tips of the projecting portions of the second grooved roller are transported at a speed which is less than the speed of the tips of the projecting portions of the first grooved roller. The tips of the projecting portions of the second grooved roller moves at a speed which stretches the web between the first and second grooved surfaces in a direction transverse to the direction in which it is transported and minimizes any stretching of the web in the direction in which the web is transported. The web is stretched between the projecting portions of the first and second grooved rollers in a direction transverse to the direction in which the web is transported. The web is separated from the first and second grooved surfaces and wrapped onto a load by providing relative rotation between the load and a dispensing mechanism for the web.

45 Claims, 11 Drawing Sheets

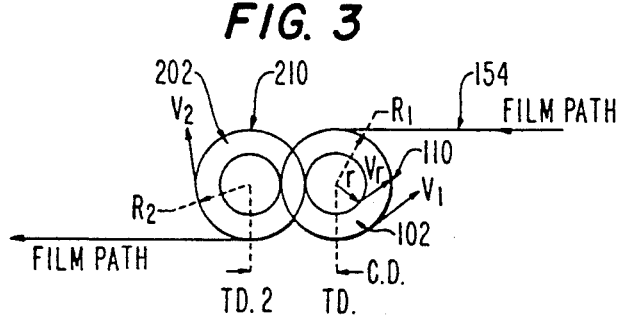
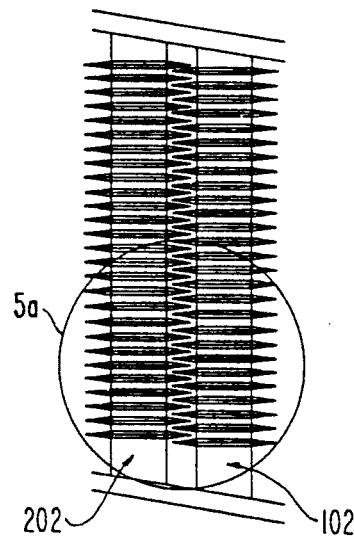
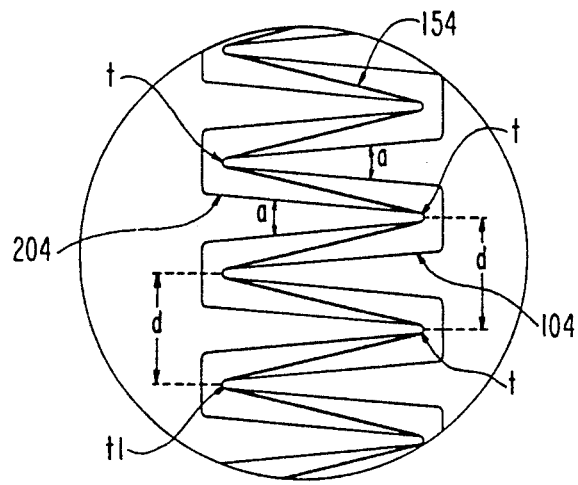
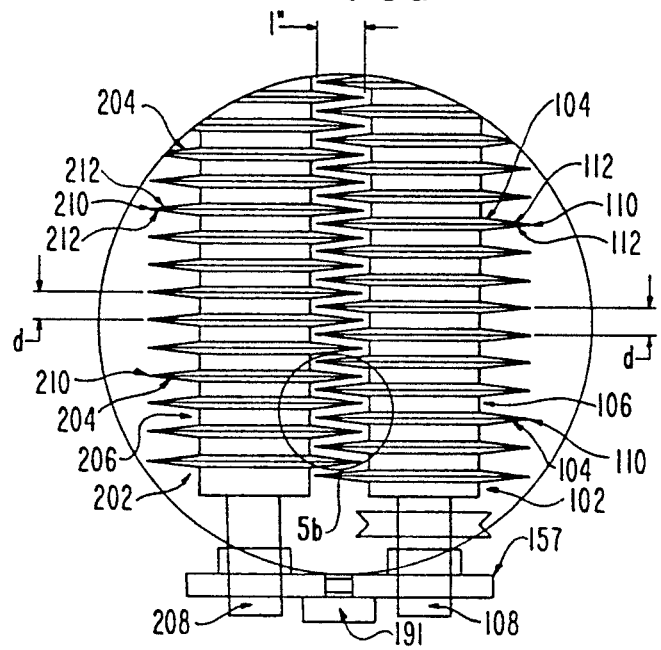

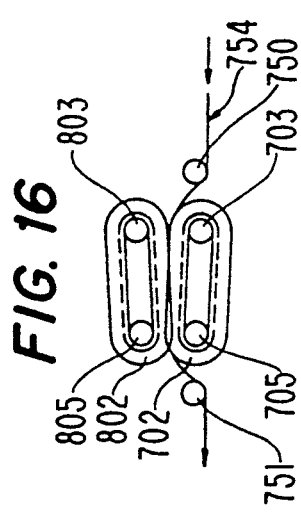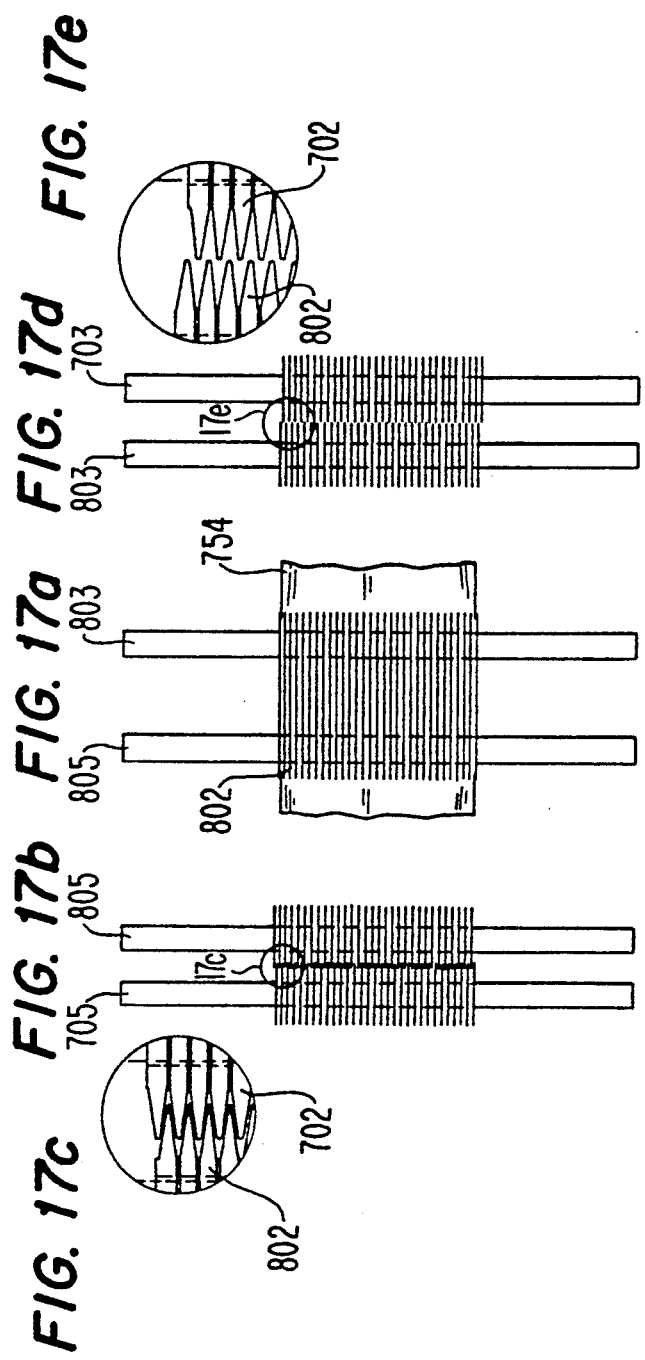

BIAXIAL STRETCH WRAPPING

BACKGROUND OF THE INVENTION

The invention relates to stretch wrapping methods and apparatus which wrap a load with stretch wrap packaging material.

DESCRIPTION OF THE RELATED ART

Stretch wrapping is a packaging technique which dispenses and wraps packaging material in a stretched condition around a load to cover and contain the load.

Early stretch wrapping techniques positioned a load on a turntable and fastened the leading end of a web of stretch wrap packaging material to the load or the turntable. As the turntable rotated, the roll of film was restrained by a brake to stretch the packaging material in the direction in which it was being dispensed as the packaging material was wrapped around the load. A similar stretch wrapping technique revolved a film web dispenser around a stationary load to wrap the stretch film web around the load.

There are a number of factors which are critical to whether a stretch wrapping technique is commercially viable. A first factor is that the technique must be reliable. For a stretch wrapping technique to be reliable, it must be successfully repeatable for an extensive period of time in a commercial environment without failure of the packaging material or other defects which would interrupt the wrapping process. In designing a stretch wrapping technique which is reliable in a commercial environment, it is necessary to take into account the skill and sophistication of the machine operator, the types of loads being wrapped and the impact of corners and other hostile load conditions on the packaging material, and the ease of employing the particular stretch wrapping technique.

A second factor for commercial viability of a stretch wrapping technique is that the cost of the additional equipment used in the stretch wrapping technique is justified by the value and significance of the advantages that it provides.

A third factor for commercial viability of a stretch wrapping technique is the speed at which the stretch wrapping technique can be performed while maintaining the quality of the packaging material. Since current stretch wrapping techniques permit packaging material to be dispensed, stretched and wrapped on a load at rates exceeding 500 feet per minute or 60 revolutions per minute it is necessary for any new stretch wrapping techniques which offer additional advantages to be operable at speeds which are possible with stretch wrapping equipment that is currently available.

A fourth factor for commercial viability of a stretch wrapping technique is the quality of the packaging material after it has been dispensed, stretched and wrapped on the load. Stretch wrapping techniques which rip or otherwise decrease the integrity or appearance of the packaging material and inhibit its ability to unitize and cover the load are generally unacceptable to the industry.

A fifth factor for the commercial viability of stretch wrapping technique is its ability to reduce the amount of packaging material necessary to wrap a given load. This reduces the cost to wrap each load. It also results in a favorable ecological impact through "source reduction," namely, less raw materials are used to make the packaging for a given load and less packaging material needs to be trashed or recycled when the load is unwrapped.

A sixth factor for the commercial viability of a stretch wrapping technique is to not appreciably weaken the packaging material in the direction in which it is being dispensed and wrapped on the load. Even more preferably, it is desirable that the stretch wrapping technique either maintain or increase the strength of the film in the direction in which it is dispensed and wrapped on the load while providing other benefits.

A seventh factor for the commercial viability of a stretch wrapping technique is flexibility and adaptability of the technique for wrapping a wide variety of load sizes and shapes.

An example of a particularly effective development in stretch wrapping was a previous invention of Lantech which employed a film web dispenser having two closely spaced rollers to stretch a web of packaging material substantially over its yield point in the dispensing direction. This technique was commercially successful for the reasons discussed above. It was reliable due to repeatability without failure in the commercial environment. It could be used to wrap a wide variety of loads and could be performed at dispensing and wrapping speeds which were used at the time of the invention. The quality of the wrapping material was maintained, and the strength of the wrapping material in the dispensing and wrapping direction was increased while reducing the amount of wrapping material required below those which were previously possible in a repetitive commercial environment.

After seeing the huge commercial success and impact of this technique of stretching packaging material in the direction in which it is dispensed and wrapped on a load, efforts were made to develop a stretch wrapping technique in which the packaging material could be stretched in a direction transverse to the direction in which it was being dispensed and wrapped on a load. It was hoped that such a development would further strengthen the packaging material, decrease the amount of packaging material needed to cover a load, provide transverse containment of the load, and provide greater flexibility in adjusting the width of a single roll of packaging material to accommodate loads of different widths.

However, until the present invention there was no commercially acceptable stretch wrapping technique which could transversely or biaxially stretch packaging material while wrapping a load. Previous techniques did not maintain reliability of the operation in a repetitive commercial environment, attain dispensing and wrapping speeds required in commercial applications, maintain the quality of the packaging material required in commercial applications, and maintain or increase the strength of the packaging material in the direction the packaging material is dispensed and wrapped on a load.

SUMMARY OF THE INVENTION

It is an object of the present invention to provide a method and apparatus for stretching packaging material in a transverse direction or biaxially when dispensing and wrapping the packaging material on a load while maintaining the reliability of the wrapping operation in a repetitive commercial environment.

It is also an object of the present invention to provide a method and apparatus for stretching packaging material in a transverse direction or biaxially when dispensing and wrapping the packaging material on a load while performing dispensing and wrapping of the packaging material at speeds which are currently being used in the industry and while maintaining the quality of the wrapping material.

It is another object of the present invention to provide a method and apparatus for stretching packaging material in a transverse direction or biaxially when dispensing and wrapping the packaging material on a load while maintaining or increasing strength of the packaging material in the dispensing and wrapping direction.

It is yet another object of the present invention to provide a method and apparatus for stretching packaging material in a transverse direction or biaxially when dispensing and wrapping the packaging material on a load while reducing the amount of packaging material necessary to wrap a given load.

It is a further object of the present invention to provide a method and apparatus for stretching packaging material in a transverse direction or biaxially when dispensing and wrapping the packaging material on a load while providing flexibility and adaptability of the techniques for wrapping a wide variety of load sizes and shapes.

It is yet a further object of the present invention to provide a method and apparatus for stretching packaging material in a transverse direction or biaxially when dispensing and wrapping the packaging material on a load while keeping the cost of the operation and apparatus sufficiently low to justify the benefits provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a process and apparatus are provided for stretch wrapping a load. A sheet of stretch wrap packaging material is introduced onto tips of projecting portions of a first grooved surface and spans nonprojecting portions of the first grooved surface.

The packaging material and the first grooved surface are transported in a direction generally parallel to the grooves. The packaging material spanning the nonprojecting portions of the first grooved surface is impinged with tips of projecting portions of a second grooved surface. It is preferable that both the first and second grooved surfaces are circumferentially grooved roller surfaces. The tips of the projecting portions of the second grooved cylindrical surface are transported at a speed which is less than the speed of the tips of projecting portions of the first grooved cylindrical surface.

The packaging material is stretched between the projecting portions of the first and second grooved surfaces in a direction transverse to the direction in which the packaging material is transported. The packaging material is then separated from the first and second grooved surfaces and wrapped onto a load.

It is preferable that the speed of the tips of the projecting portions of the second grooved surface are toward the center of a range defined by the tangential speed of the first grooved surface at the radius where the tips of projecting portions of the second grooved surface first impinge the packaging material and the tangential speed of the first grooved surface at the radius where the tips of projecting portions of the second grooved surface maximally impinge the packaging material.

It is preferable that the projecting portions of the second grooved surface are transported at a speed which stretches the packaging material between the projecting portions of the first and second grooved surfaces in a direction transverse to the direction in which it is transported and minimizes any stretching of the packaging material in the direction in which the packaging material is transported.

It is preferable to regulate the tension and speed of the packaging material upstream of the first and second grooved surfaces to prevent the packaging material from slipping on the grooved surfaces and to prevent the packaging material from substantially narrowing before being introduced onto the projecting portions of the first grooved surface.

It is preferable that the projecting portions of the grooved surfaces have a V-shaped cross-section. It is preferable that the projecting portions are closely spaced and contact a minimal percentage of the original sheet width between adjacent projecting portions.

It is preferable to also stretch the packaging material in the direction in which it is dispensed and wrapped onto the load in order to biaxially stretch the packaging material while wrapping it around the load.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is an enlarged view of a portion of FIG. 1.

FIG. 4 is a side view of FIG. 3.

FIG. 5a is an enlarged view of a portion of FIG. 4.

FIG. 5b is an enlarged view of a portion of FIG. 5a.

FIG. 12b is a first side view of FIG. 12a.

FIG. 12d is a second side view of FIG. 12a.

FIG. 13b is a side view of FIG. 13a.

FIG. 15a is a side view of the apparatus shown in FIG. 14a.

FIG. 15b is an enlarged view of a portion of FIG. 15a.

FIG. 16 is a top view of the sixth embodiment of a stretch wrapping apparatus incorporating the teachings of the present invention.

FIG. 17a is a side view of the apparatus shown in FIG. 16.

FIG. 17b is a left end view of the apparatus shown in FIGS. 16 and 17a.

FIG. 17c is a enlarged view of a portion of FIG. 17b.

FIG. 17d is a right end view of the apparatus shown in FIGS. 16 and 17a.

FIG. 17e is an enlarged view of a portion of FIG. 17d.

FIG. 18b is a bottom view of the apparatus shown in FIG. 18a.

DETAILED DESCRIPTION OF THE PREFERRED EMBODIMENTS

Figure 1:
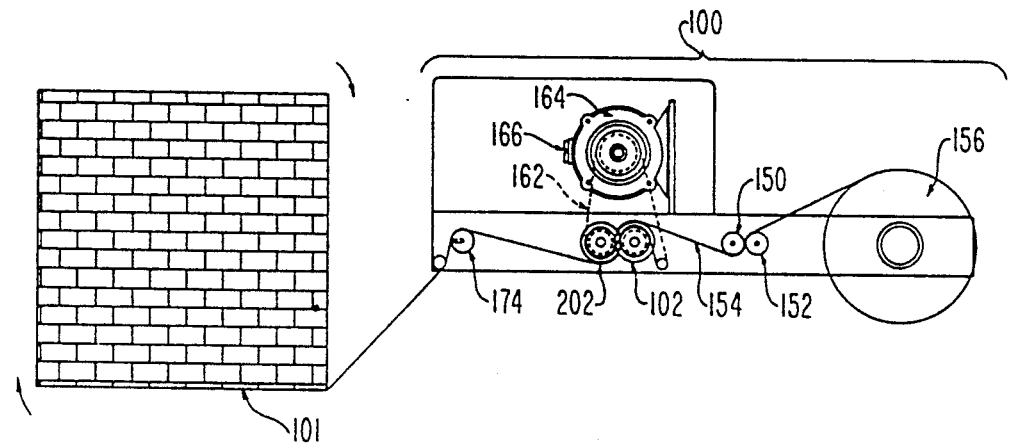
FIG. 1 is a top schematic view of a first embodiment of a stretch wrapping apparatus according to the present invention.

Reference will now be made in detail to the present preferred embodiments of the invention as illustrated in the accompanying drawings.

According to the present invention, an apparatus is provided for stretch wrapping a load. A first embodiment of a stretch wrapping apparatus according to the present invention is shown in FIGS. 1–5.

According to the present invention, the stretch wrapping apparatus includes a first grooved surface having projecting portions and nonprojecting portions, with the first grooved surface being movable in a direction generally parallel to its grooves. As shown in FIGS. 1–5, the first grooved surface is a first circumferentially grooved roller 102 having projecting portions 104 with tips 110, and nonprojecting portions 106. The first grooved roller 102 is mounted on axle 108 for rotational movement centered about axle 108. As a result, the grooved surface of first grooved roller 102 is movable in a direction generally parallel to the circumferential grooves defined by projecting portions 104 and nonprojecting portions 106.

Figure 2:
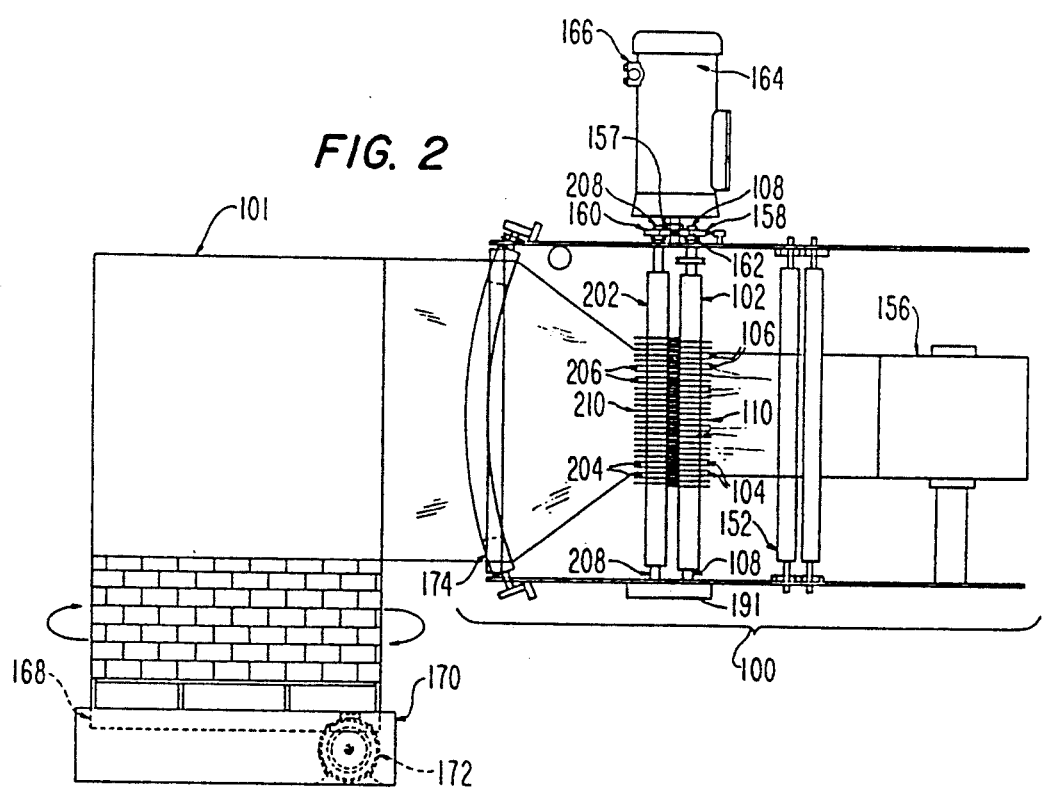
FIG. 2 is a side view of FIG. 1.

According to the present invention, the stretch wrapping apparatus also includes a second grooved surface having projecting portions which extend between the projecting portions of the first grooved surface, and nonprojecting portions in which the projecting portions of the first grooved surface extend. The second grooved surface is movable in a direction generally parallel to its grooves. As shown in FIGS. 1 and 2, the second grooved surface is a second circumferentially grooved roller 202 having projecting portions 204 with tips 210, and nonprojecting portions 206. The second grooved roller 202 is mounted on axle 208 for rotational movement centered about axle 208. As a result, the grooved surface of second grooved roller 202 is movable in a direction generally parallel to the circumferential grooves defined by projecting portions 204 and nonprojecting portions 206.

According to the present invention, means are provided for orienting a sheet on the projecting portions of the first grooved surface before impinging the sheet with projecting portions of the second grooved surface. As shown in FIGS. 1 and 2, the means for orienting a sheet include rollers 150 and 152 which define the path of stretch wrap packaging material 154 from roll 156.

Stretch wrap packaging material 154 is preferably a sheet in web form and is preferably one of the stretchable, orientable commercially available thermoplastic materials designed and sold for stretch wrapping operations.

According to the present invention, means are provided for transporting the projecting portions of the second grooved surface at a speed which stretches the sheet between the projecting portions of the first and second grooved surfaces in a direction transverse to the direction in which it is transported and minimizes any stretching of the sheet in the direction in which the web is transported. The grooved surfaces ar preferably transported at relative speeds which align the force lines in the sheet in a direction substantially transverse to the direction in which the sheet is conveyed.

As shown in FIGS. 1 and 2, the means for maintaining the speeds of the grooved surfaces preferably includes a controllable fixed ratio drive mechanism 157 having sprockets 158 and 160 of fixed relative diameters attached to grooved rollers 102 and 202, an endless chain 162 engaging sprockets 158 and 160, and a motor 164 with motor controller 166 for controllably driving endless chain 162. A motorless chain linked drive unit or a pair of commonly controlled motors also may be used to achieve a fixed ratio between the speeds of the first and second grooved surfaces.

According to the present invention, means are provided for maintaining the tips of the projecting portions of the second grooved roller at a speed which is less than the speed of the tips of the projecting portions of first grooved roller.

Referring to FIGS. 3–5, drive mechanism 157 maintains the tips 210 of the projecting portions 204 of second grooved roller 202 at a speed which is less than the speed of the tips 110 of the projecting portions 104 of first grooved roller 102. It is preferable that drive mechanism 157 maintain the tangential speed $V_2$ of the tips 210 of the projecting portions 204 of the second grooved roller 202 substantially within and toward the center of the range between the tangential speed $V_1$ of the first grooved roller 102 at the radius $R_1$ where the tips 210 of projecting portions 204 of the second grooved roller 202 first impinge the packaging material 154 and the tangential speed $V_r$ of the first grooved roller 102 at the radius r where the tips 210 of projecting portions 204 of the second grooved roller 202 maximally impinge the packaging material 154. By maintaining the speed in this range, any stretching of the sheet in the direction in which it is transported is minimized throughout the transverse stretching operation and particularly both at minimal and maximal impingement of the sheet by the projecting portions.

As shown in FIGS. 3 and 4, and as expressed by the following equations, it is preferable that the speed $V_2$ of the tips 210 of the projecting portions 204 of the second grooved roller 202 is approximately one half the speed $V_1$ of the tips 110 of projecting portions 104 of the first grooved roller 102, times the sum of the radius $R_2$ of the projecting portions 204 of the second grooved surface 202 over the radius $R_1$ of the projecting portions 104 of the first grooved surface 102, and the radius $R_2$ of the projecting portions 204 of the second grooved surface 202 over the difference between the center distance CD of the grooved rollers 102 and 202 and the radius $R_2$ of the projecting portions 204 of the second grooved roller 202. It is seen from FIGS. 3–5 that r represents the difference between the center distance CD of grooved rollers 102 and 202 and the radius $R_2$ of the projecting portions 204 of the second grooved surface 202.

$$V_2 = \tfrac{1}{2} V_1 \left( \frac{R_2}{R_1} + \frac{R_2}{CD - R_2} \right)$$

$$V_2 = \tfrac{1}{2} V_1 \left( \frac{R_2}{R_1} + \frac{R_2}{r} \right)$$

According to the present invention, the first and second grooved surfaces, orienting means and movement maintaining means define a dispensing means. As shown in FIGS. 1 and 2, the dispensing means includes a dispenser 100 for stretch wrapping packaging material 154.

According to the present invention, the stretch wrapping apparatus includes means for providing relative rotation between the dispensing means and a load to wrap the packaging material around the load. As shown in FIGS. 1 and 2, the means for providing relative rotation between packaging material dispenser 100 and the load 101 includes a turntable 168 which supports load 101, a base 170 on which turntable 168 is rotatably mounted and a motor drive system 172 for rotating the turntable 168 relative to packaging material dispenser 100.

Figure 6A:
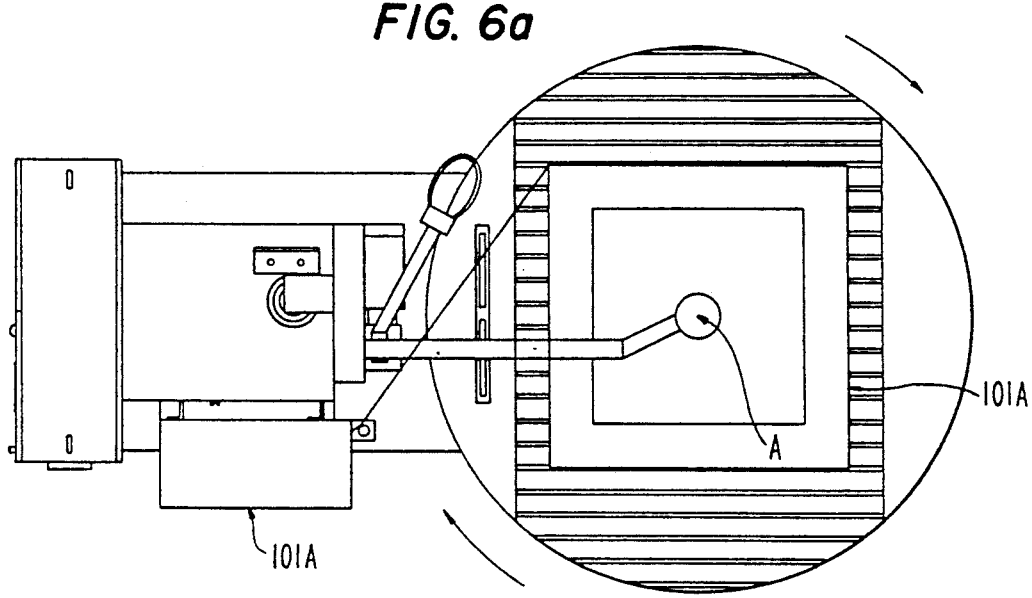
FIG. 6a is a top view of a first alternative for providing rotation between a packaging material dispenser and a load.
Figure 6B:
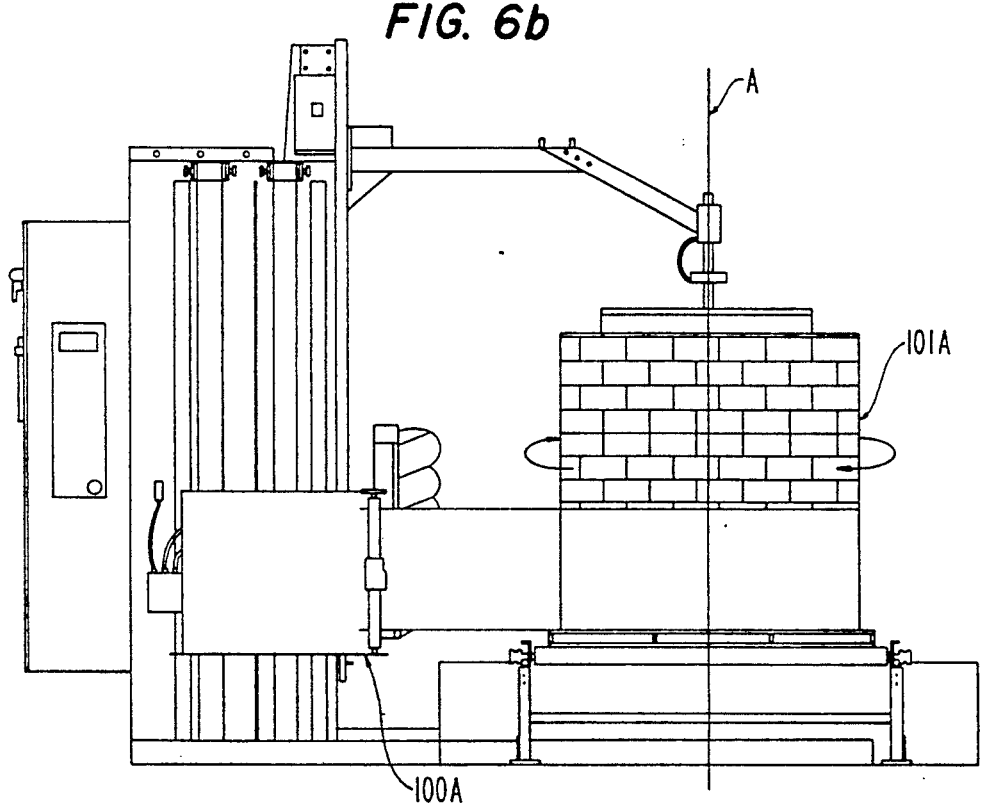
FIG. 6b is a side view of a first alternative for providing rotation between a packaging material dispenser and a load.
Figure 7A:
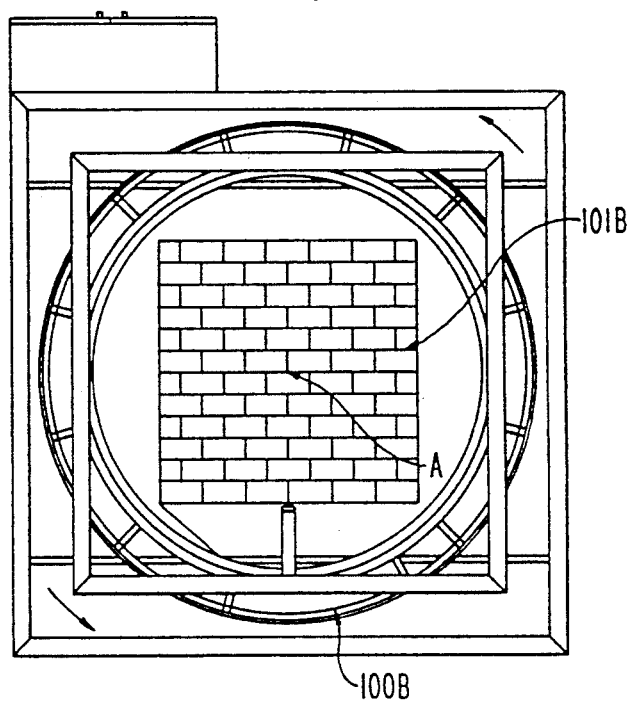
FIG. 7a is a top view of a second alternative for providing rotation between a packaging material dispenser and a load.
Figure 7B:
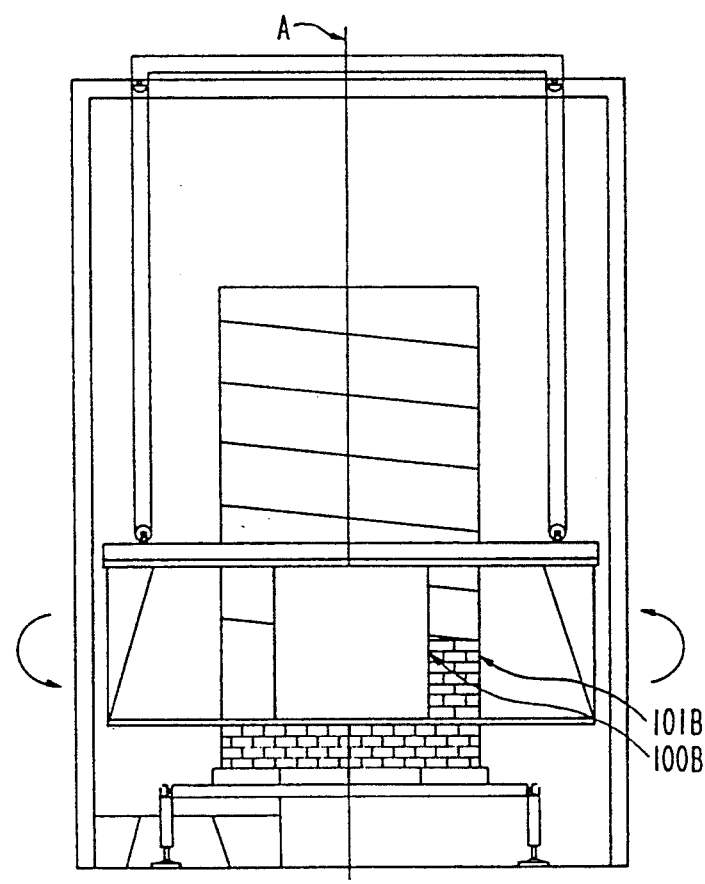
FIG. 7b is a side view of a second alternative for providing rotation between a packaging material dispenser and a load.

As shown in FIGS. 6a and 7a, the means for providing relative rotation between the dispensing means and a load can be either the alternative shown in FIGS. 6a and 6b of a rotatable turntable which rotates the load 101a relative to a stationary packaging material dispenser 100a, or the alternative shown in FIGS. 7a and 7b of rotating a packaging material dispenser 100b around a stationary load 101b. As shown in FIGS. 6 and 7, the axis A of relative rotation between the load and the dispenser for the packaging material may be in the vertical direction, such as in the unitization of pallet loads. Alternatively the axis of relative rotation may be in the horizontal direction such as in the bundling of packages moving on a horizontal conveyor belt, as shown for example in U.S. Pat. No. 4,866,909 which is incorporated herein by reference. The packaging material is preferably dispensed and wrapped onto the load in a condition in which it is stretched or tensioned in the direction in which the packaging material is transported and dispensed.

As shown in FIG. 4 and 5, it is preferable that the area of the projecting portions 104 and 204 of grooved rollers 102 and 202 on which the sheet rests during stretching have flat sides 112 and 212 which give projecting portions 104 and 204 a generally V shaped cross section. The flat sides forming a V shaped cross section are preferable, in contrast to projecting portions having either a convexly curved sinusoidal shaped cross section or a U shaped cross section.

It is preferable that sides 112 and 212 of projecting portions 104 and 204 converge outwardly at an angle in the range of about 5 to 90 degrees and even more preferably in the range of about 10 to 20 degrees. It is preferable to use projecting portions having a slender profile as opposed to projecting portions having a fat or wide profile.

It is preferable that projecting portions 104 and 204 are configured to contact and support less than about 20 percent, more preferably less than about 15 percent, and even more preferably less than about 10 percent, of the original sheet width between corresponding points of adjacent projecting portions 104 at maximal impingement $I_{max}$. This leaves the substantial remaining portion of the sheet width unsupported and available for stretching in the transverse direction.

It is preferable that the pitch of the rollers, namely the distance d between adjacent tips 110 of roller 102, and the distance d between adjacent tips 210 of roller 202, is in the range of about ⅛ to ½ inches and even more preferably in the range of about ¼ to ⅜ inches.

The term tip sharpness radius t of the tip for tips 110 and 210 is used to describe the general size and sharpness of the tip and is the radius of curvature at the tip or distance from a point that is of equal distance from the sidewalls and apex of the projecting portion as shown by the location of the crosses in FIG. 5.

It is preferable that the tip sharpness radius of projecting portions 104 and 204 is as sharp as possible without cutting the packaging material when in operation, and preferably is in the range of inches 1/128 to 1/16 inches and even more preferably in the range of 1/64 to 1/32 inches.

It is preferable that the tip sharpness radius t of the tips 110 and 210 are in the range of about 3 to 33 percent, and even more preferably about 6 to 12 percent of the pitch or distance d between the tips 110 of the projecting portions 104 of first grooved roller 102.

It is preferable that the maximal impingement $I_{max}$ as shown in FIG. 4 is in the range of about ⅛ to 1 inch, and even more preferably about ¼ to ½ inch.

It is preferable that the maximal impingement $I_{max}$ is substantially greater than, and even more preferably in the range of at least about twice the distance between the tips 110 of the projecting portions 104 on grooved roller 102.

Currently, it is preferably to construct grooved rollers 102 and 104 by machining circumferential grooves onto nylon cylinders which are force fit onto metal shafts. The surfaces of the circumferentially grooved rollers preferably have a smooth finish. Alternative construction methods include casting the rollers in a grooved shape, or assembling a series of fixed or floating disks on a keyed shaft.

A currently preferred embodiment uses two identical machined nylon rollers which have an outside radius R of 3 inches. Each roller has a ¼ inch pitch or distance d between the tips of its projecting portions. The tip sharpness radius t of the tips of the projecting portions is 1/64 inches. The projecting portions have flat side which converge outwardly at an angle a of 10%. The maximal impingeme $I_{max}$ is ½ inches and the projecting portions contact 12 percent of the original sheet width at maximal impingement. The ¼ inch width of the sheet between adjacent tips on a roller is stretched to ¾ inches or 300% of its original width.

It is preferable to provide means for regulating the tension and speed of the packaging material 154 upstream of the first and second grooved rollers 102 and 202 to prevent the packaging material 154 from slipping on the surface of grooved rollers 102 and 104 and to prevent the packaging material 154 from substantially narrowing before being introduced onto the projecting portions 104 of the first grooved roller 102. As shown in FIGS. 1 and 2, the means for regulating the tension and speed of the packaging material include rollers 150 and 152 which restrain the web 154 to accomplish these functions. Rollers 150 and 152 can be attached to a frictional braking device or be mechanically connected to the drive train 157 connecting grooved rollers 102 and 202. Alternatively, the means for performing the function of regulating the tension and speed can be an additional stretching system or a brake on film roll 156 or a similar mechanism.

It is currently preferable to minimize the distance between the regulating means and the first grooved roller 102 to prevent substantial narrowing of the packaging material. A currently acceptable distance is about 1½ inches.

It is preferable that the stretching wrapping apparatus include a means for spreading the web in the transverse direction after stretching the web in the transverse direction. It is preferable that this spreading means include a bowed roller 174 mounted to rotate about a fixed curved axis.

According to one aspect of the present invention, means are provided for variably controlling the maximum impingement $I_{max}$ of the first and second grooved surfaces As shown in FIGS. 2 and 5a, the means for variably controlling the maximum impingement is control mechanism 191 which adjusts and sets the distance between the journals for the first and second grooved surfaces 102 and 202 and thus controls the center distance CD and maximum impingement $I_{max}$ The control mechanism 191 is preferably located on the journals on both sides of the first and second grooved surfaces 102 and 202. Depending on the desired cost, the control mechanism 191 can be as simple as manually actuated clamps or screws which connect the journals and frame, or an automated motor control system which automatically set the spacing between the journals.

The ability to control the maximum impingement $I_{max}$ permits a stretch wrapping apparatus to control and vary the dispensed width of packaging material from a single roll of packaging material having a given width.

Figure 8:
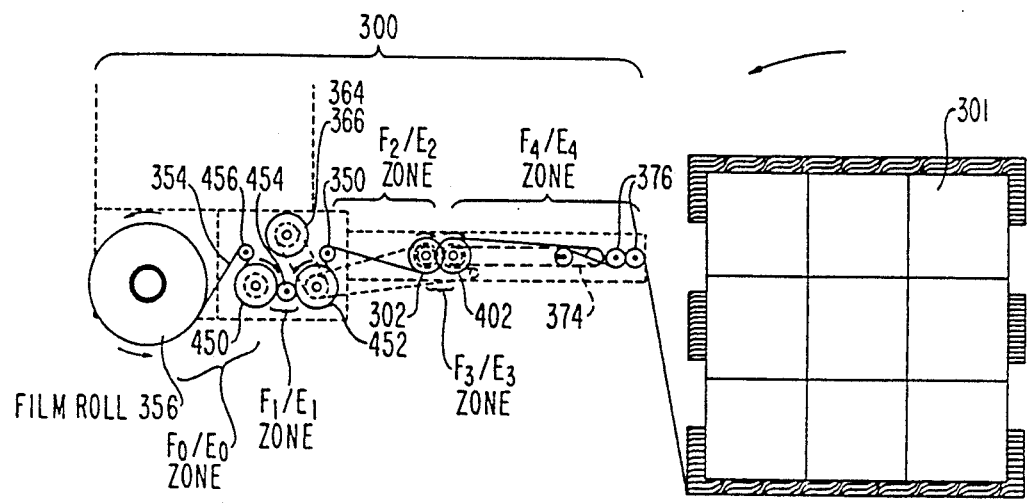
FIG. 8 is a top view of a second embodiment of a stretch wrapping apparatus incorporating the teachings to the present invention.
Figure 9:
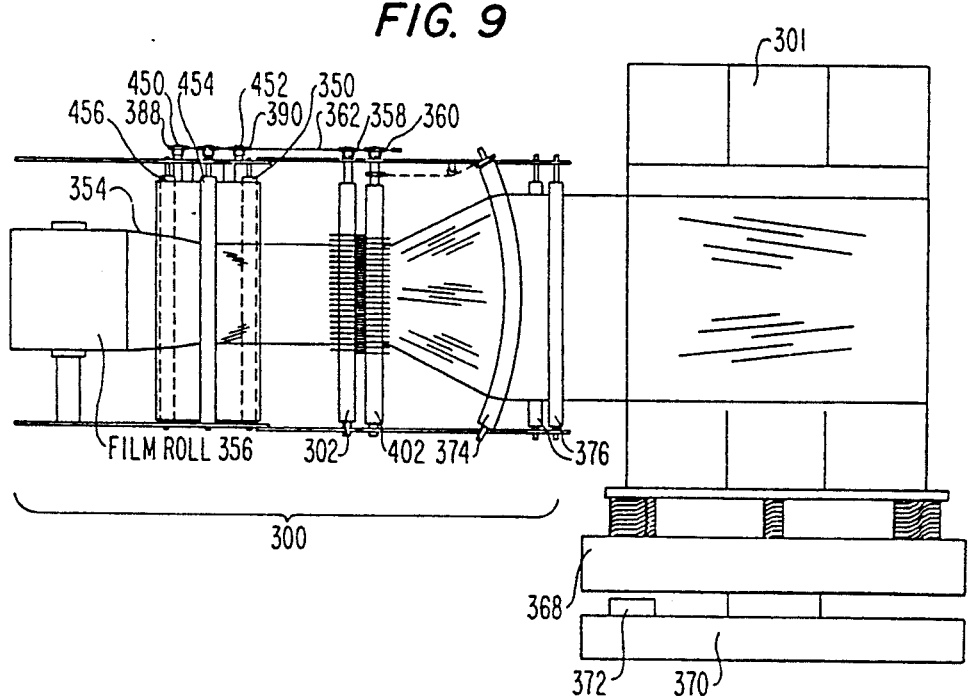
FIG. 9 is a side view of the apparatus shown in FIG. 8.

According to one aspect of the present invention, an apparatus is provided for stretch wrapping a load with packaging material which is being biaxially stretched as it is being dispensed and wrapped on a load. As shown in FIGS. 8 and 9, the stretch wrapping apparatus includes a first grooved surface which is preferably a first circumferentially grooved roller 302, similar to the first grooved roller 102 described above. First grooved roller 302 has projecting portions and nonprojecting portions and rotates so as to be movable in a direction generally parallel to its grooves.

The stretch wrapping apparatus also includes a second grooved surface which is preferably a second circumferentially grooved roller 402, similar to grooved roller 202 described above. Second grooved roller 402 has projecting portions which extend between the projecting portions of the first grooved roller and nonprojecting portions in which the projecting portions 304 of the first grooved roller 302 extend. The second grooved roller 402 rotates so as to be movable in a direction generally parallel to its grooves.

Means are provided for orienting packaging material on the projecting portions of the first grooved roller 302 before impinging the packaging material with projecting portions 404 of the second grooved roller 402. As shown in FIGS. 8 and 9, the orienting means is preferably a roller 350 which directs the path of the stretch wrap packaging material 354.

Means are provided for maintaining the movement of the tips of the projecting portions of the second grooved roller 302 at a speed $V_2$ which is relative to the speed $V_1$ of movement of the tips of the projecting portions of the first grooved roller 302 as described above for the apparatus shown in FIGS. 1 and 2. As shown in FIGS. 8 and 9, the maintaining means includes sprockets 358 and 360 attached to rollers 302 and 402 coupled by chain drive 362 to motor 364 and motor controller 366. These components operate in a manner similar to the corresponding components shown in FIGS. 1 and 2, and serve to maintain the relative rotation of first grooved roller 302 and second roller 402 at a selected relative velocity.

According to the invention, means are provided for transporting the packaging material and for stretching the packaging material in the direction in which it is transported. The means for stretching the packaging material in the direction in which the packaging material is transported may alternatively be positioned upstream or downstream of the means for stretching the packaging material in the direction transverse to the direction in which the packaging material is transported. Therefore the step of stretching in the direction in which the packaging material is transported may be performed either before or after the steps of stretching in the direction transverse to the direction in which the packaging material is transported.

As shown in FIGS. 8 and 9, the means for stretching the web in the direction in which the web is transported includes an upstream roller 450 and a downstream roller 452 which is closely spaced to upstream roller 450. Rollers 454, 456 and 350 maintain web 354 in position around a sufficient percentage of the circumference of rollers 450 and 452 to prevent to web from slipping on those rollers 450 and 452. The surfaces of rollers 450 and 452 may be a suitable nonslip substance such as a coating made of a vinyl plastisol which has been foamed and machined as described in U.S. patent application Ser. No. 07/289,442.

The stretch wrapping apparatus also includes means for maintaining the speed of downstream roller 452 at a speed which is greater than the speed of the upstream roller 450. It is preferable that upstream and downstream rollers 450 and 452 are maintained at a constant relative velocity and are closely spaced to each other to prevent the packaging material from substantially narrowing while being stretched. Preferably, roller 450 includes sprocket 388 and roller 452 includes sprocket 390 which are coupled together for relative rotation by chain drive 362 which also couple rollers 450 and 452 to rollers 302 and 402. Alternatively the maintaining means may include a motorless chain linked drive unit or a pair of commonly controlled motors According to an aspect of the present invention, after stretching the packaging material in the direction that it is being transported, it is preferable to reduce the force and elongation on the packaging material in that direction before introducing the packaging material onto the tips of the projecting portions of the first grooved surface for stretching in the transverse direction. The force and elongation on the packaging material as it is introduced on the first grooved surface should be sufficiently high for traction on the projecting portions of the first grooved surface and not so high as to tear the packaging material on the tips of the first grooved surface or cause excessive neckdown of the packaging material.

The stretch wrapping apparatus also includes means for providing relative rotation between the dispensing means which includes the components of dispenser 300, and a load 301 to wrap the packaging material 354 around the load 301. As shown in FIGS. 8 and 9, the means for providing relative rotation include a turntable 368 which is driven by motor 372 to rotate about base 370, rotating the load 301 relative to the dispenser 300 for packaging material 354. As discussed in relation to FIGS. 6 and 7, either the load may rotate relative to the dispenser or the dispenser may rotate around the load.

In FIGS. 8 and 9, means are provided to spread the web in the transverse direction after stretching the web in the direction in which it is dispensed It is preferable that the spreading means includes a bowed roller 374 which rotates about a curved fixed axis and is driven by the chain drive which drives the other rollers.

Figure 10:
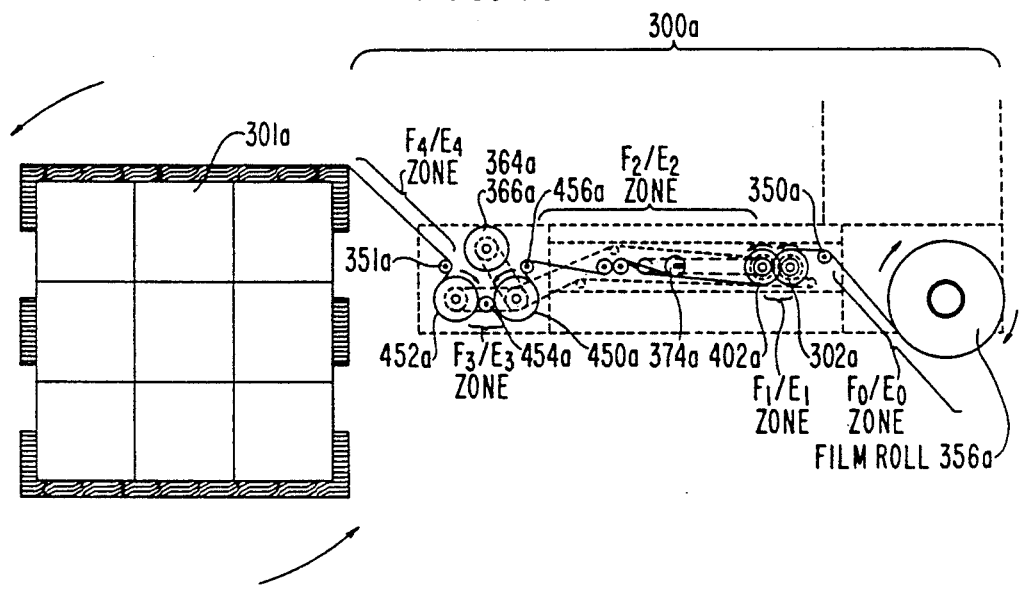
FIG. 10 is a top view of a third embodiment of a stretch wrapping apparatus incorporating the teachings of the present invention.
Figure 11:
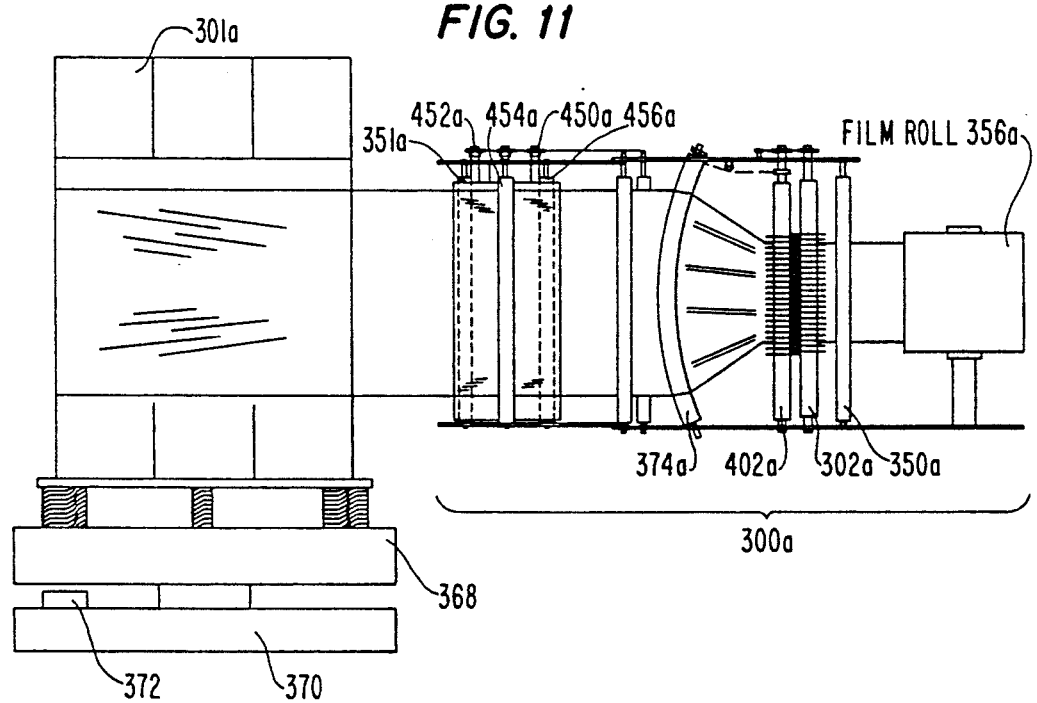
FIG. 11 is a side view of the apparatus shown in FIG. 10.
Figure 12A:
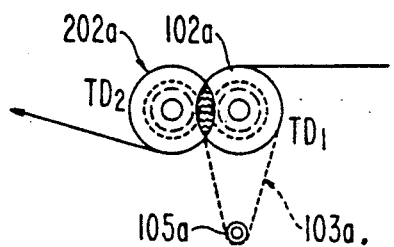
FIG. 12a is a top view of a first alternative to the first embodiment shown in FIG. 1.
Figure 12D:
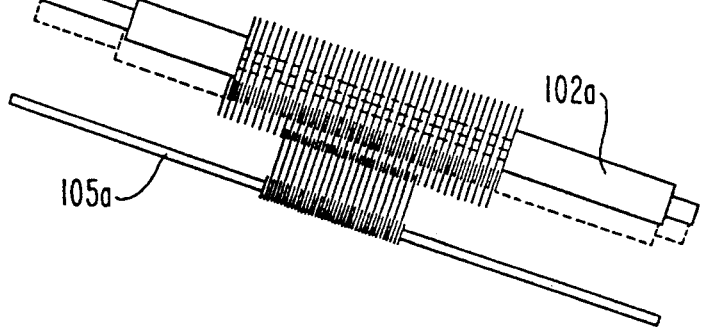
Figure 12B:
Figure 12C:
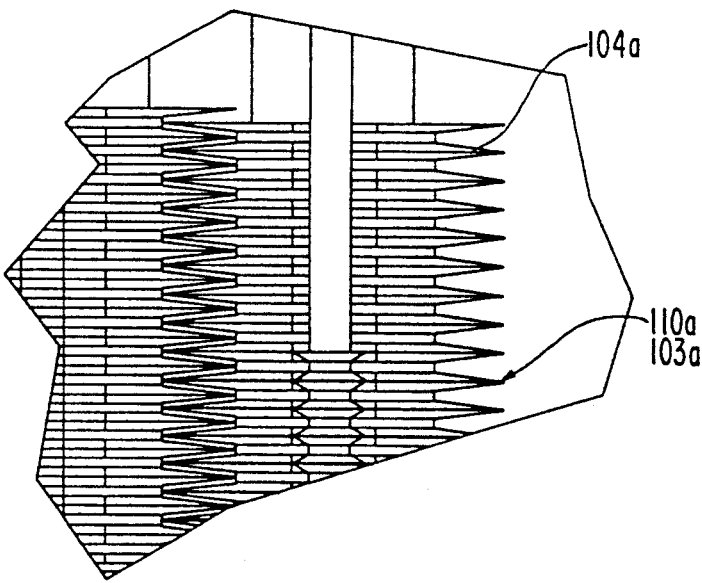
FIG. 12c is an enlarged view of a portion of FIG. 12b.

FIGS. 10 and 11 show an alternate embodiment to that shown in FIGS. 8 and 9. Corresponding numerals are used to designate corresponding elements. In the embodiment shown in FIGS. 8 and 9, the packaging material is stretched in the dispensing direction before it is stretched in the transverse direction. In the embodiment shown in FIGS. 10 and 11, the packaging material is stretched in the dispensing direction after it is stretched in the transverse direction.

According to an aspect of the present invention, it is preferable to stretch the packaging material over its yield point in the direction transverse to the direction in which it is being dispensed to plastically deform the packaging material in the direction transverse to the direction in which the packaging material is being dispensed. According to another aspect of the present invention, it is preferable to stretch the packaging material over its yield point in the direction transverse to the direction in which it is being dispensed and in the direction in which it is dispensed to plastically deform the packaging material both in the direction transverse to the direction in which it is being dispensed and in the direction in which it is dispensed.

Various corner compensating devices such as dancers bars and speed control devices may be used in some applications of the invention. For example, a load cell may be used to monitor the force exerted on the packaging material by the load and the output of the load cell can be used to vary the speed of the motor driving the stretching devices to vary the supply speed of the packaging material in accordance with the demand speed for the packaging material.

According to an aspect of the present invention, means may be provided to separate the sheet from one of the grooved surfaces. As shown in FIG. 12, the separating means preferably include a series of belts 103a which circulate around a grooves in tips 110a of projecting portions 104a, and a roller 105a. Other delaminating means include combs and rollers which assist in removing the web from the upstream roller.

Figure 13B:
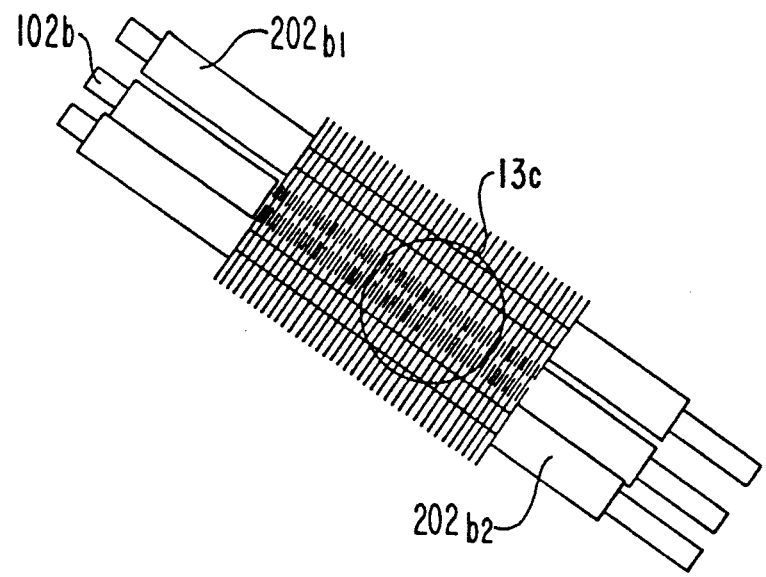
Figure 13C:
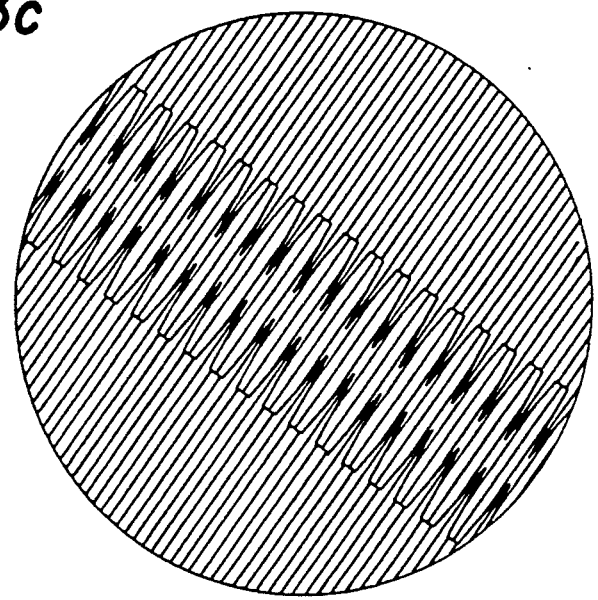
FIG. 13c is an enlarged view of a portion of 13b.
Figure 13A:
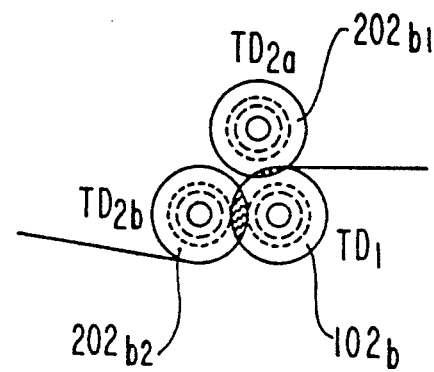
FIG. 13a is a top view of a second alternative to the embodiment shown in FIG. 1.

According to an aspect of the present invention, the second grooved surface includes a plurality of surfaces which sequentially impinge the packaging material spanning the nonprojecting portions of the first grooved roller to increasing extents. As shown in FIG. 13, the plurality of second grooved surfaces include roller $202b_1$ which impinges the packaging material a given distance below the tips of the projecting portions of first grooved roller 102b. Subsequently roller $202b_2$ impinges the packaging material even farther than the packaging material was impinged by roller $202b_1$.

According to an aspect of the present invention, one of the first and second grooved surfaces is a convex side of a cylinder and a portion of the other is a segment of a concave side of a cylinder. As shown in FIG. 14a, the first grooved surface includes an endless belt 502 which rotates about rollers 503 and 505. As shown in FIG. 15b, the grooved endless belt 502 includes projecting portions and nonprojecting portions. As shown in FIGS. 14a, roller 550 acts as a means for orienting the sheet 554 on the projecting portions of first grooved surface, grooved endless belt 502, before impinging sheet 554 with projecting portions of the second grooved surface, grooved roller 602. Roller 551 acts as a means for maintaining sheet 554 on the projecting portions of first grooved surface, grooved endless belt 502, after sheet 554 is no longer impinged with the projecting portions of the second grooved surface, grooved roller 602.

Figure 14B:
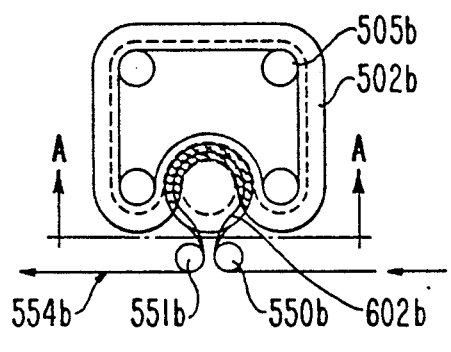
FIG. 14b is a top view of a fifth embodiment of a stretch wrapping apparatus incorporating the teachings of the present invention.
Figure 14A:
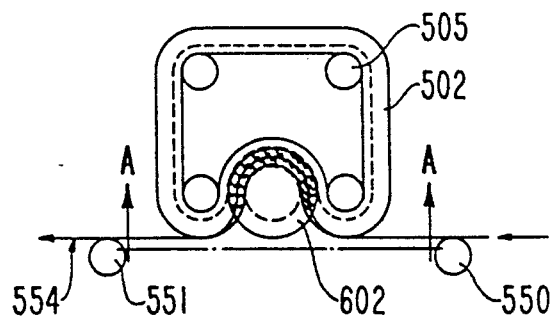
FIG. 14a is a top view of a fourth embodiment of a stretch wrapping apparatus incorporating the teachings of the present invention.
Figure 15B:
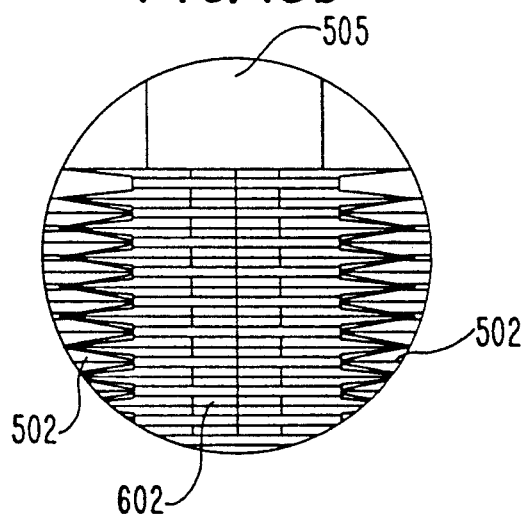

FIG. 14b is an alternative to the embodiment shown in FIG. 14a. As shown in FIG. 14b, the first grooved surface includes grooved rollers 602b having projecting portions and non-projecting portions similar to roller 602 in FIG. 14a. The second grooved surface includes an endless belt 502b, similar to endless belt 502 in FIG. 14a, which rotates about rollers 503b and 505b. Roller 550b acts as a means for orienting the sheet 554b on the projecting portions of first grooved surface, grooved roller 602b, before impinging sheet 554b with projecting portions of the second grooved surface, grooved endless belt 502b Roller 551b acts as a means for orienting the sheet 554b on the projecting portions of grooved roller 602b after sheet 554b is no longer impinged by grooved endless belt 502b.

Figure 15A:
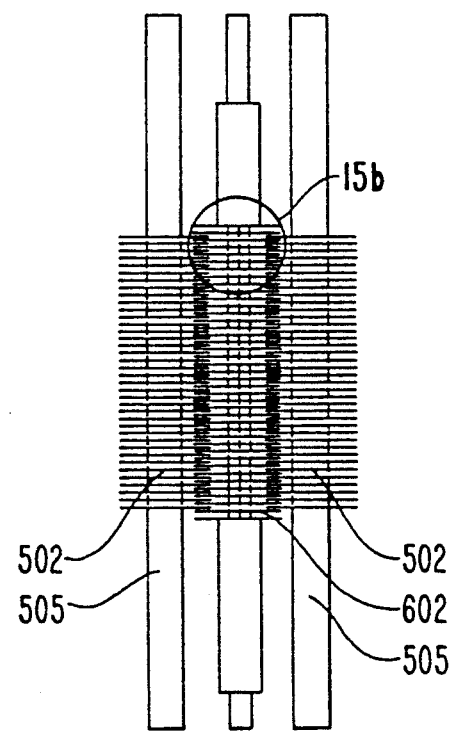

The shape of the projecting portions and the impingement relationships of the embodiments shown in FIGS. 14 and 15 are preferably the same as those in the embodiment shown and described in relation to FIGS. 1-5 which uses two grooved rollers. It is preferable to transport the projecting portions of the second grooved surface at a speed which stretches the web between the projecting portions of the first and second grooved surfaces in a direction transverse to the direction in which is transported and minimizes any stretching of the web in the direction in which the web is transported.

According to an aspect of the present invention, the first and second grooved surfaces are generally flat and converge toward each other. As shown in FIGS. 16 and 17, the first grooved surface includes first endless grooved belt 702 which is driven to revolve around rollers 703 and 705. Second grooved surface includes endless belt 802 which is driven to revolve about rollers 803 and 805. As shown in FIG. 17, the first grooved surface 702 includes projecting portions and nonprojecting portions. The second grooved surface 802 includes projecting portions and nonprojecting portions.

As shown in FIGS. 16 and 17, roller 750 acts as a means for orienting sheet 754 on the projecting portions of the first grooved surface 702 before impinging sheet 754 with the projecting portions of the second grooved surface 802. Roller 751 acts as an means for orienting sheet 754 on projecting portions of the first grooved surface 702 after sheet 754 is no longer impinged with the projecting portions of the second grooved surface 802. Sheet 754 enters on the right side of the arrangement shown in FIG. 16 where, as shown in FIG. 17e, the projecting portions are not interdigitated. Sheet 754 exits on the left side of the arrangement shown in FIG. 16 where, as shown in FIG. 17c the projecting portions are interdigitated. The projecting portions gradually become interdigitated in the right to left direction of FIG. 16.

The shape of the projecting portions and the impingement relationships of the embodiments shown in FIGS. 16 and 17 are preferably the same as those in the embodiment shown and described in relation to FIGS. 1-5 which uses two grooved rollers. It is preferable to transport the projecting portions of the second grooved surface at a speed which stretches the web between the projecting portions of the first and second grooved surfaces in a direction transverse to the direction in which is transported and minimizes any stretching of the web in the direction in which the web is transported.

Figure 18B:
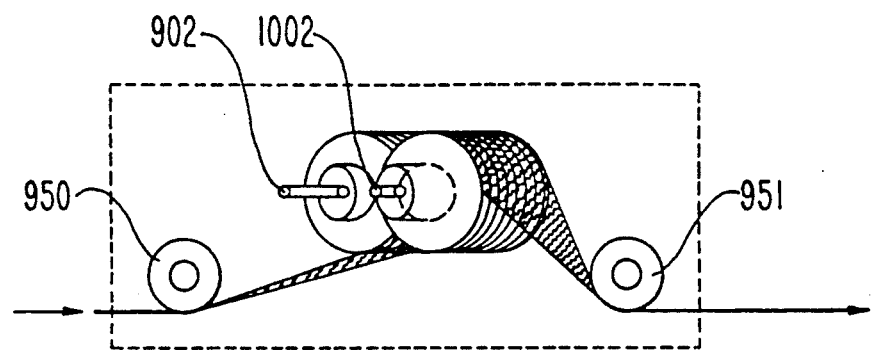
Figure 18A:
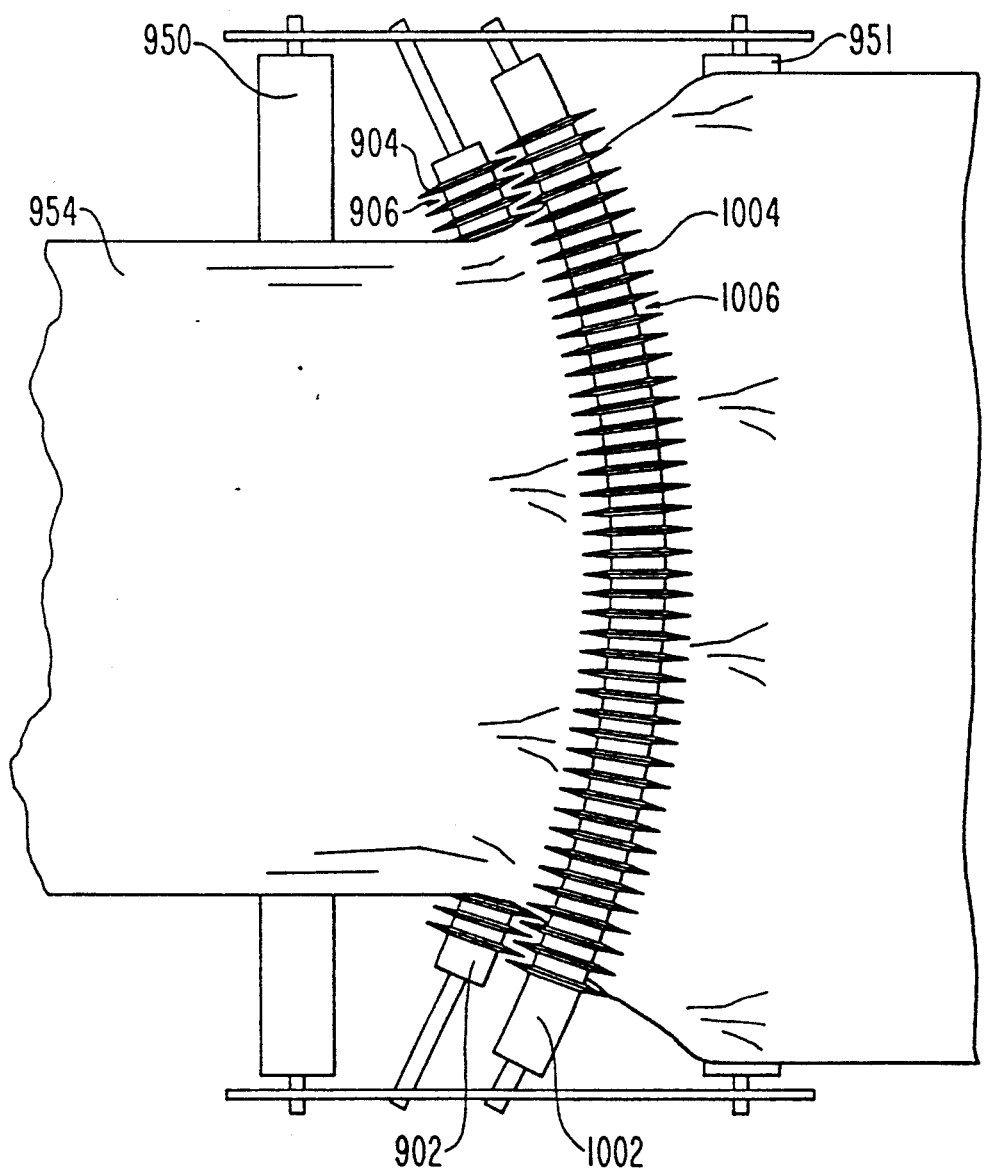
FIG. 18a is a side view of a seventh embodiment of a stretch wrapping apparatus incorporating the teachings of the present invention.

According to an aspect of the present invention, both of the first and second grooved surfaces are generally cylindrical and rotate about axes which are fixed, curved and parallel to each other. As shown in FIG. 18, the first grooved surface 902 includes a series for projecting portions 904 and nonprojecting portions 906. Second grooved surface 1002 has projecting portions 1004 and nonprojecting portions 1006. In this arrangement, the first and second grooved surfaces both stretch and the web in the direction transverse to the direction in which the web is transported. Such an arrangement alleviates the need for an additional means for spreading the film.

Roller 950 is a means for orienting a sheet 954 on a projecting portions of the first grooved surface 902 before impinging sheet 954 with a projecting portions of the second grooved surface 1002. Roller 1050 is a means for orienting sheet 954 after sheet 954 is no longer impinged with the projecting portions of the first grooved surface 902.

The shape of the projecting portions and the impingement relationships of the embodiment shown in FIGS. 18 is preferably the same as those in the embodiment shown and described in relation to FIGS. 1-5 which uses two grooved rollers. It is preferable to transport the projecting portions of the second grooved surface at a speed which stretches the web between the projecting portions of the first and second grooved surfaces in a direction transverse to the direction in which is transported and minimizes any stretching of the web in the direction in which the web is transported.

The inventions so far described are stretch wrapping methods and apparatus. The drawing figures and the description of the arrangements depicted in those drawing figures also disclose various embodiments of methods and apparatus which may be employed in fields of invention different and apart from the stretch wrapping methods and apparatus of the packaging art.

These additional fields of invention include methods and apparatus for transverse and biaxial stretching of sheet materials which can be employed as an integral part of the manufacturing process for producing such sheet materials or as a separate processing operation after sheet materials have been produced.

The methods and apparatus for transverse stretching of sheet materials can be used alone to stretch the sheet materials in a direction transverse to the direction in which they are being transported. In addition, these processes and apparatus for manufacturing or processing transversely stretched sheet material can be used in combination with methods and apparatus for manufacturing or processing longitudinally stretched sheet material to result in methods and apparatus for manufacturing or processing biaxially stretched sheet materials.

In addition to manufacturing or processing sheet material which is in a planar form, it is possible to manufacture or process sheet material which is in a tubular form or in the form of a container or series of containers such as bags.

Additional advantages and modifications will readily occur to those skilled in the art. The invention in its broader aspect is, therefore, not limited to the specific details, representative apparatus and illustrative examples shown and described. Accordingly, departures may be made from such details without departing from the spirit or scope of the general inventive concepts as defined by the appended claims and their equivalents.

What is claimed is:

1. A process for stretch wrapping a load with a sheet of stretch wrap packaging material comprising:
   introducing the sheet of stretch wrap packaging material onto tips of projecting portions of a first circumferentially grooved roller surface and spanning nonprojecting portions of the first grooved surface;
   transporting the sheet and the first grooved surface in a direction generally parallel to the grooves;
   impinging the sheet spanning the non-projecting portions of the first grooved surface with tips of projecting portions of a second circumferentially grooved roller surface downstream of where the sheet of stretch wrap packaging material is introduced onto the tips of projecting portions of the first circumferentially grooved roller surface;
   transporting the tips of nonprojecting portions of the second grooved surface at a speed which is less than the speed of the tips of projecting portions of the first grooved surface;
   stretching the sheet between the projecting portions of the first and second grooved surfaces in a direction transverse to the direction in which the sheet is transported;
   separating the stretched sheet from the first and second grooved surfaces; and
   wrapping the stretched sheet around a load.

2. A process for stretch wrapping a load with a sheet of stretch wrap packaging material comprising:
   transporting the sheet of stretch wrap packaging material and stretching the sheet in the direction in which the sheet is transported;
   introducing the sheet onto tips of projecting portions of a first circumferentially grooved roller surface and spanning nonprojecting portions of the first grooved surface;
   transporting the sheet and the first grooved surface in a direction generally parallel to the grooves;
   impinging the sheet spanning the nonprojecting portions of the first grooved surface with tips of projecting portions of a second circumferentially grooved roller surface downstream of where the sheet of stretch wrap packaging material is introduced onto the tips of projecting portions of the first circumferentially grooved roller surface;

transporting the tips of projecting portions of the second grooved surface at a speed which is less than the speed of the tips of projecting portions of the first grooved surface;

stretching the sheet between the projecting portions of the first and second grooved surfaces in a direction transverse to the direction in which the sheet is transported;

separating the stretched sheet from the first and second grooved surfaces; and wrapping the stretched sheet around a load.

3. An apparatus for stretch wrapping a load with stretch wrap packaging material comprising:

means for dispensing a sheet of stretch wrap packaging material including a first rotatable roller with a circumferentially grooved surface having projecting portions with tips and nonprojecting portions for transporting the sheet in a direction generally parallel to the grooves, a second rotatable roller with a circumferentially grooved surface having projecting portions with tips which extend between the projecting portions of the first grooved surface and nonprojecting portions in which the projecting portions of the first grooved surface extend for impinging and stretching the sheet in a direction transverse to the direction in which the sheet is being transported, means for orienting the sheet on the tips of the projecting portions of the first grooved surface before impinging the sheet with the tips of the projecting portions of the second grooved surface, means for maintaining the tips of the projecting portions of the second grooved surface at a speed which is less than the speed of the tips of the projecting portions of the first grooved surface; and means for providing relative rotation between the dispensing means and a load to wrap the stretched sheet around the load.

4. An apparatus for stretch wrapping a load with a sheet of stretch wrap packaging material comprising:

means for dispensing a sheet of stretch wrap packaging material including means for transporting the sheet and stretching the sheet along the direction in which it is transported, a first rotatable roller with a circumferentially grooved surface having projecting portions with tips and nonprojecting portions for transporting the sheet in a direction generally parallel to the grooves, a second rotatable roller with a circumferentially grooved surface having projecting portions with tips which extend between the projecting portions of the first grooved surface and nonprojecting portions in which the projecting portions of the first grooved surface extend for impinging and stretching the sheet in a direction transverse to the direction in which the sheet is being transported, means for orienting the sheet on the tips of the projecting portions of the first grooved surface before impinging the sheet with the tips of the projecting portions of the second grooved surface, means for maintaining the tips of the projecting portions of the second grooved surface at a speed which is less than the speed of the tips of the projecting portions of the first grooved surface; and means for providing relative rotation between the dispensing means and a load to wrap the stretched sheet around the load.

5. A process for stretching a sheet comprising:

introducing the sheet onto tips of projecting portions of a first circumferentially grooved roller surface and spanning nonprojecting portions of the first grooved surfaces;

transporting the sheet and the first grooved surface in a direction generally parallel to the grooves;

impinging the sheet spanning the nonprojecting portions of the first grooved surface with tips of projecting portions of a second circumferentially grooved roller surface downstream of where the sheet is introduced onto the tips of projecting portions of the first circumferentially grooved roller surface;

transporting the tips of projecting portions of the second grooved surface at a speed which is less than the speed of the tips of projecting portions of the first grooved surface;

stretching the sheet between the projecting portions of the first and second grooved surfaces in a direction transverse to the direction in which the sheet is transported;

separating the stretched sheet from the first and second grooved surfaces.

6. A process for stretching a sheet comprising:

transporting the sheet and stretching the sheet in the direction in which the sheet is transported;

introducing the sheet onto tips or projecting portions of a first circumferentially grooved roller surface and spanning nonprojecting portions of the first grooved surface;

transporting the sheet and the first grooved surface in a direction generally parallel to the grooves;

impinging the sheet spanning the nonprojecting portions of the first grooved surface with tips of projecting portions of a second circumferentially grooved roller surface downstream of where the sheet is introduced onto the tips of projecting portions of the first circumferentially grooved roller surface;

transporting the tips of projecting portions of the second grooved surface at a speed which is less than the speed of the tips of projecting portions of the first grooved surface;

stretching the sheet between the projecting portions of the first and second grooved surfaces in a direction transverse to the direction in which the sheet is transported;

separating the stretched sheet from the first and second grooved surfaces.

7. An apparatus for stretching a sheet comprising:

a first rotatable roller with a circumferentially grooved surface having projecting portions with tips and nonprojecting portions for transporting the sheet in a direction generally parallel to the grooves;

a second rotatable roller with a circumferentially grooved surface having projecting portions with tips which extend between the projecting portions of the first grooved surface and nonprojecting portions in which the projecting portions of the first grooved surface extend for impinging and stretching the sheet in a direction transverse to the direction in which the sheet is being transported;

means for orienting the sheet on the tips of the projecting portions of the first grooved surface before impinging the sheet with the tips of the projecting portions of the second grooved surface;

means for maintaining the tips of the projecting portions of the second grooved surface at a speed which is less than the speed of the tips of the projecting portions of the first grooved surface.

8. An apparatus for stretching a sheet comprising:

means for transporting a sheet and stretching the sheet along the direction in which it is transported;

a first rotatable roller with a circumferentially grooved surface having projecting portions with tips and nonprojecting portions for transporting the sheet in a direction generally parallel to the grooves;

a second rotatable roller with a circumferentially grooved surface having projecting portions with tips which extend between the projecting portions of the first grooved surface and nonprojecting portions in which the projecting portions of the first grooved surface extend for impinging and stretching the sheet in a direction transverse to the direction in which the sheet is being transported;

means for orienting the sheet on the tips of the projecting portions of the first grooved surface before impinging the sheet with the tips of the projecting portions of the second grooved surface;

means for maintaining the tips of the projecting portions of the second grooved surface at a speed which is less than the speed of the tips of the projecting portions of the first grooved surface.

9. The process of claim 1, 2, 5, or 6 wherein the speed of the tips of projecting portions of the second grooved surface is greater than the tangential speed of the first grooved surface at the radius where the tips of the projecting portions of the second grooved surface maximally impinge the sheet.

10. The process of claim 1, 2, 5, or 6 wherein the speed of the tips of the projecting portions of the second grooved surface is substantially less than the tangential speed of the first grooved surface at the radius where the tips of projecting portions of the second grooved surface first impinge the sheet and substantially greater than the tangential speed of the first grooved surface at the radius where the tips of projecting portions of the second grooved surface maximally impinge the sheet 11. The process of claim 1, 2, 5, or 6 wherein the speed of the tips of projecting portions of the second grooved surface is toward the center of the range between the tangential speed of the first grooved surface at the radius where the tips of projecting portions of the second grooved surface first impinge the sheet and the tangential speed of the first grooved surface at the radius where the tips of projecting portions of the second grooved surface maximally impinge the sheet.

12. The process of claim 1, 2, 5, or 6 wherein the speed of the tips of the projecting portions of the second grooved surface is approximately the average of the tangential speed of the first grooved surface at the radius where the tips of projecting portions of the second grooved surface first impinge the sheet and the tangential speed of the first grooved surface at the radius where the tips of projecting portions of the second grooved surface maximally impinge the sheet.

13. The process of claim 1, 2, 5, or 6 wherein the speed of the tips of projecting portions of the second grooved surface is approximately one half the speed of the tips of projecting portions of the first grooved surface, times the sum of the radius of the second roller at the tips of the projecting portions of the second grooved surface over the radius of the first roller at the tips of the projecting portions of the first grooved surface, and the radius of the second roller at the tips of the projecting portions of the second grooved surface over the difference between the center distance of the grooved rollers and the radius of the second roller at the tips of the projecting portions of the second grooved surface 14. The apparatus of claim 3, 4, 7, or 8 wherein the maintaining means maintains the tips of projecting portions of the second grooved surface at a speed greater than the tangential speed of the first grooved roller at the radius where the tips of projecting portions of the second grooved roller maximally impinge the sheet.

15. The apparatus of claim 3, 4, 7, or 8 wherein the maintaining means maintains the tips of projecting portions of the second grooved surface at a speed substantially less than the tangential speed of the first grooved surface at the radius where the tips of projecting portions of the second grooved surface first impinge the sheet and substantially greater than the tangential speed of the first grooved surface at the radius where the tips of projecting portions of the second grooved surface maximally impinge the sheet.

16. The apparatus of claim 3, 4, 7, or 8 wherein the maintaining means maintains the tips of projecting portions of the second grooved surface at a speed is toward the center of the range between the tangential speed of the first grooved surface at the radius where the tips of projecting portions of the second grooved surface first impinge the sheet and the tangential speed of the first grooved surface at the radius where the tips of projecting portions of the second grooved surface maximally impinge the sheet.

17. The apparatus of claim 3, 4, 7, or 8 wherein the maintaining means maintains the tips of the projecting portions of the second grooved surface at a speed which is approximately the average of the tangential speed of the first grooved surface at the radius where the tips of projecting portions of the second grooved surface first impinge the sheet and the tangential speed of the first grooved surface at the radius where the tips of projecting portions of the second grooved surface maximally impinge the sheet.

18. The apparatus of claim 3, 4, 7, or 8 wherein the maintaining means maintains the tips of projecting portions of the second grooved surface at a speed which is approximately one half the speed of the tips of projecting portions of the first grooved surface, times the sum of the radius of the second roller at the tips of the projecting portions of the second grooved surface over the radius of the first roller at the tips of the projecting portions of the first grooved surface, and the radius of the second roller at the tips of the projecting portions of the second grooved surface over the difference between the center distance of the grooved rollers and the radius of the second roller at the tips of the projecting portions of the second grooved surface.

19. The apparatus of claim 3, 4, 7 or 8 wherein the projecting portions have sides which converge outwardly at an angle in the range of about 50 to 90 degrees.

20. The apparatus of claim 3, 4, 7 or 8 wherein the projecting portions have sides which converge outwardly at an angle in the range of about 10 to 20 degrees.

21. The apparatus of claim 3, 4, 7 or 8 wherein the projecting portions have flat sides.

22. The apparatus of claim 3, 4, 7 or 8 wherein the projecting portions have a shape which supports less than about 20% of the sheet on the projecting portions along the direction transverse to the grooves and leaves more than about 80% of the sheet width unsupported and available for stretching along the direction transverse to the grooves.

23. The apparatus of claim 3, 4, 7 or 8 wherein the projecting portions have a shape which supports less than about 15% of the sheet on the projecting portions along the direction transverse to the grooves and leaves more than about 85% of the sheet width unsupported and available for stretching along the direction transverse to the grooves.

24. The apparatus of claim 3, 4, 7 or 8 wherein the projecting portions have a shape which supports less than about 10% of the sheet on the projecting portions along the direction transverse to the grooves and leaves more than about 90% of the sheet width unsupported and available for stretching along the direction transverse to the grooves.

25. The apparatus of claim 3, 4, 7 or 8 wherein the distance between the tips of the projecting portions of the first grooved surface is in the range of about ⅛ to ½ inches.

26. The apparatus of claim 3, 4, 7 or 8 wherein the distance between the tips of the projecting portions of the first grooved surface is in the range of about ¼ to ⅜ inches.

27. The apparatus of claim 3, 4, 7 or 8 wherein the tip sharpness radius of the projecting portions is in the range of about 1/128 to 1/16 inches.

28. The apparatus of claim 3, 4, 7 or 8 wherein the tip sharpness radius of the projecting portions is in the range of about 1/64 to 1/32 inches.

29. The apparatus of claim 3, 4, 7 or 8 wherein the maximal impingement is in the range of a ⅛ to 1 inches.

30. The apparatus of claim 3, 4, 7 or 8 wherein the maximal impingement is in the range of about ¼ to ½ inches.

31. The apparatus of claim 3, 4, 7 or 8 wherein the maximal impingement is substantially greater than the distance between the tips of the projecting portions of the first grooved surface.

32. The apparatus of claim 3, 4, 7 or 8 wherein the maximal impingement is in the range of about twice the distance between the tips of the projecting portions of the first grooved surface.

33. The apparatus of claim 3, 4, 7 or 8 wherein the tip sharpness radius of the tips is in the range of about 3 to 33% of the distance between the tips of the projecting portions of the first grooved surface.

34. The apparatus of claim 3, 4, 7 or 8 where the tip sharpness radius of the tips is in the range of about 6 to 12% of the distance between the tips of the projecting portions of the first grooved surface.

35. The apparatus of claim 3, 4, 7 or 8 including means for spreading the sheet in the transverse direction after stretching the sheet in the transverse direction.

36. The apparatus of claim 3, 4, 7 or 8 including a bowed roller which rotates about a fixed curved axis for spreading the sheet in the transverse direction after stretching the sheet in the transverse direction.

37. The apparatus of claim 3, 4, 7 or 8 wherein the first and second grooved surfaces are bowed rollers which rotate about fixed curved axes for both stretching and spreading the sheet in the transverse direction.

38. The apparatus of claim 3, 4, 7 or 8 wherein the second grooved surface includes a plurality of surfaces for sequentially impinging the sheet to increasing extents.

39. The apparatus of claim 3, 4, 7 or 8 wherein the second grooved surface includes a plurality of circumferentially grooved rollers for sequentially impinging the sheet to increasing extents.

40. The apparatus of claim 3, 4, 7 or 8 including means for separating the sheet from one of the grooved surfaces after the sheet has been stretched in the transverse direction.

41. The apparatus of claim 3, 4, 7 or 8 including belts which circulate around the projecting portions of one of the grooved surfaces and a location spaced from the grooved surface for separating the packaging material from said one of the grooved surfaces after the packaging material has been stretched in the transverse direction.

42. The process of claim 5 or 6 wherein the step of introducing a sheet includes introducing a flattened tubular sheet onto tips of projecting portions of the first grooved surface and spanning nonprojecting portions of the first grooved surface.

43. The process of claim 5 or 6 wherein the step of introducing a sheet includes introducing a flattened bag onto tips of projecting portions of a first grooved surface and spanning nonprojecting portions of the first grooved surface.

44. The process of claims 1, 2, 5 or 6 wherein the transporting steps include transporting the tips of the projecting portions of the first and second grooved surfaces at respective speeds which minimize any stretching of the sheet in the direction in which the sheet is transported while the sheet is being stretched between the grooved surfaces in a direction transverse to the direction in which the sheet is transported.

45. The apparatus of claims 3, 4, 7 or 8 wherein the maintaining means maintains the tips of the projecting portions of the first and second grooved surfaces at respective speeds which minimize any stretching of the sheet in the direction in which the sheet is transported while the sheet is being stretched between the grooved surfaces in a direction transverse to the direction in which the sheet is transported.

* * * * *

UNITED STATES PATENT AND TRADEMARK OFFICE
CERTIFICATE OF CORRECTION

PATENT NO. : 5,161,349

DATED : November 10, 1992

INVENTOR(S) : Patrick R. Lancaster, III, William G. Lancaster, John Fain
Phil Moore, Curtis Martin It is certified that error appears in the above-identified patent and that said Letters Patent is hereby corrected as shown below:

Title page, col. 1, lines 3 and 4, after "Inventors:" delete "Mount Wastington" and insert --Mount Washington--.

Claim 1, col. 14, line 45, delete "nonprojecting" and insert --projecting--.

Claim 6, col. 16, line 35, delete "or" and insert --of--.

Claim 16, col. 18, line 35, after "speed" insert --which--.

Claim 19, col. 19, line 5, delete "50" and insert --5--.

Claim 29, col. 19, line 50, delete "a" and insert --about--.

Signed and Sealed this

Ninth Day of November, 1993

Attest:

BRUCE LEHMAN

Attesting Officer

Commissioner of Patents and Trademarks